3,158,669
ROTARY INTAGLIO PRINTING OF RUBBER
GASKETS AND SIMILAR SHAPES
David G. Greenlie, Weston, and Edward W. Merrill, Belmont, Mass., assignors to W. R. Grace & Co., Cambridge, Mass., a corporation of Connecticut
Filed Apr. 3, 1961, Ser. No. 100,064
7 Claims. (Cl. 264—153)

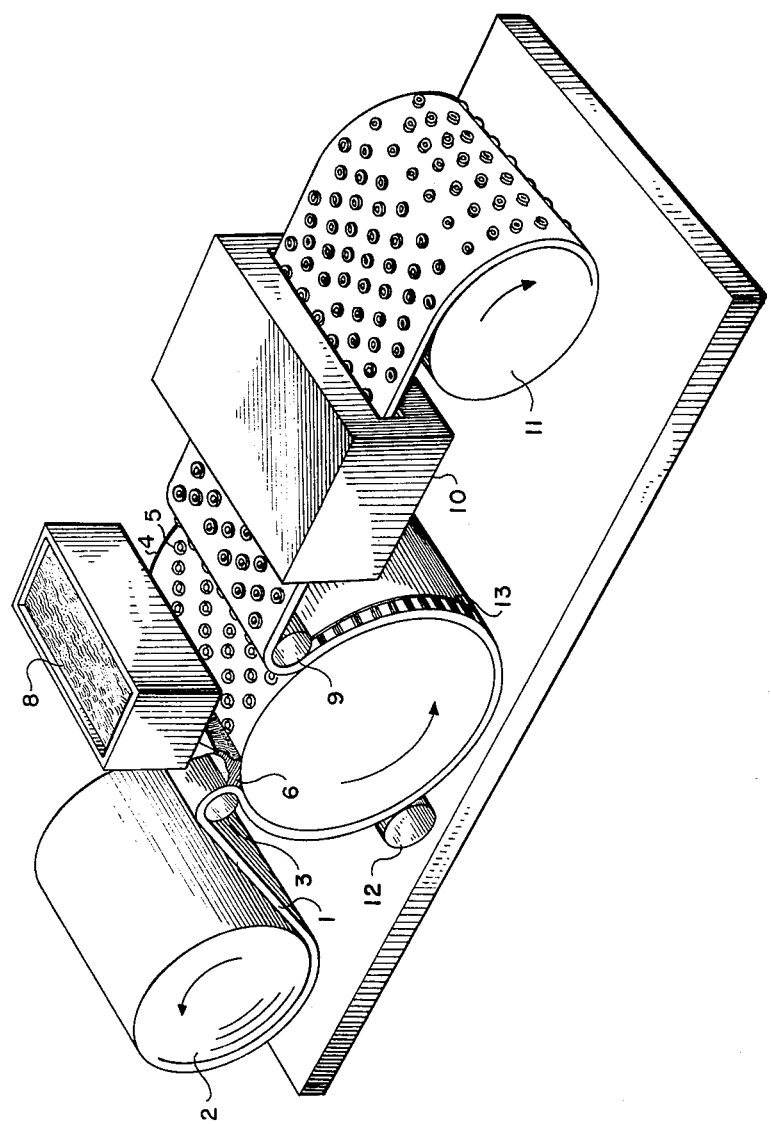

This invention is concerned with the large volume manufacture of complex elastomeric shapes, such as rubber O-ring gaskets, by the rotary intaglio "printing" or molding thereof on a receptive substratum. A preferred embodiment is directed to the fabrication of small circular seals comprising a highly resilient rubber ring carried on a supporting paper-reinforced, gas impervious substratum and suited for insertion in caps to form crown closures.

Crown closures have customarily used cork or composition cork as a gasketing material. Substitutes for cork have recently been developed, such as cellular or puffed polyvinyl chloride resin seals derived from flowed-in plastisols, premolded polyethylene gaskets, and synthetic rubber gaskets formed by screen printing either directly in the cap or on the metal sheet from which the cap is subsequently stamped.

This invention proposes a method of forming seals for crown, lug, and screw closures that is capable of unusually large volume production and low unit costs. While the method of this invention is particularly directed to the manufacture of seals for crown closures, it has utility in any situation where there is a need to form a multiplicity of rubber shapes on a supporting substratum. For example, the present method is applicable to the manufacture of a non-skid felt rug pad covered with numerous small rubber squares with embossed surfaces, or a thin wooden or cardboard sheet printed with small adhesive rubber circles to which a second thin wooden or cardboard sheet can be bonded to give a resilient sandwich useful for forming shipping containers. The method of this invention is also amenable to the manufacture of gaskets for automobile trim fasteners. It is particularly suited to the manufacture of such non-round shapes as seals for ham can lids and gaskets for electric conduit junction box covers.

In brief compass, the present invention proposes the forming of a multiplicity of elastomeric or flexible shapes on a form-stable, preferably flexible, substratum such as a plastic film, a metal sheet or a waterproof paper. The method of this invention comprises filling a multiplicity of mold cavities of the desired shape, cut in a cylindrical "printing" surface, with a liquid molding composition containing a plastic material in solution, dispersion or suspension that will set up to a form-stable, flexible solid when heated, such as a rubber latex, a plastisol, or a crosslinkable plastic like an epoxy or polyester. The substratum then is firmly and evenly placed against the printing surface, serving as the "cope" of the molds, and the molding composition is heated in the mold cavities to convert it to a form-stable shape which adheres and transfers to the substratum. The substratum may be coated as with an adhesive to enable it to pick up the rubber shapes. The substratum is thereafter removed from the printing or molding surface, and the rubber shapes thereon may then be further treated as required, e.g., if a heat-curable latex composition is used, the gelled rubber shapes are dried and cured by heating.

The mold cavities are made by engraving the printing surfaces, with there being one mold cavity for each individual shape. While the method of this invention can be used to form large-sized shapes such as 55 gallon drum gaskets (about 24 inches in diameter), it has particular utilized when the cope or substratum speed is greater than 20 linear feet per minute, small shapes containing 0.15 to 18.50 grains of rubber each and having an enclosed surface area under 50 square inches are being molded and more than 2 mold cavities per square foot are used. The invention is particularly suited for the molding of small thin sectioned shapes, i.e., those having a mid-plane distance in cross-section no greater than 0.15 inch at any one point. While the method of this invention is inclusive of flat bed printing, it is much preferred to use rotary printing because it permits continuous operation.

The substratum can serve as only a temporary carrier for the molded shapes, or can become an integral part of the finished product. The substratum when manufacturing crown closure seals is a component of the finished product, and is preferably a material that will serve as a gas barrier as well as a mechanical support for the rubber seal or ring. While sheet plastics such as polyethylene, or wax impregnated paper per se, can be used as the substratum when making crown closure seals, it is preferred from the standpoint of cost and performance to use a laminate consisting of a waterproofed paper for mechanical strength, an intermediate thin plastic film such as a polyvinylidene chloride as a vapor barrier, and a tough outer protective plastic film such as a polyethylene.

This invention will become clear from the following examples and description of the drawings attached to and forming a part of this specification. The drawing schematically illustrates one embodiment of the method of this invention applied to the manufacture of seals, referred to as spot seals, for crown closure or bottle caps.

The crown closure seals per se are the subject matter of patent application, Serial No. 100,313, "Seal for Crown Closures" by E. W. Merrill and D. D. Hundt, filed on the same day as this application.

Referring to the drawing, the substratum 1 to receive the rubber shapes, in this case rubber rings having an outside diameter of about 0.9 to 1 inch, is taken off unwind roll 2. The substratum is a laminate consisting of a microwax impregnated 110 pound kraft paper lamina, an intermediate 0.5 mil thick vinylidene chloride polymer gas barrier film (Dow Chemical Saran resin FF–220) bonded thereon with a latex adhesive (Naugatuck 510C) and a 1.5 mil polyethylene film (melt index 2) directly bonded over the polyvinylidene chloride film. The paper side of the laminate which receives the rubber rings is coated with a rubber pickup coating (cyclized natural rubber in an amount of 0.5 gram per square foot).

The rubber rings are placed on the substratum by passing the substratum over nip roll 3 which forces it firmly and evenly against the molding surface of a molding drum 4. A web guide can be used if necessary to accurately position the substratum on the molding surface. The molding surface consists of a multiplicity of engraved mold cavities 5 of the shape desired. These are filled with a heat-gelling synthetic rubber latex prior to contact with the substratum. Doctoring or roll filling (broadly squeegeeing) can be used to force the latex into the cavities. It has been found, however, that it is difficult to get complete filling of the cavities by squeegeeing. It is much preferred, therefore, to maintain a puddle 6 of the latex in front of roll 3, and to have substratum 1 serve as a continuously renewing doctoring surface and as the cope of the two-piece mold. This prevents run out of the latex. The force on roll 3 is sufficient to prevent the latex from coating the surface of drum 4 to any appreciable extent. The latex is supplied from reservoir 8, which is preferably maintained at a temperature about 50° C. below the gelling temperature of the latex but above its cold-setting temperature.

The molding drum is heated as with steam to cause the molding composition to set. When a gelling latex is used as the molding composition, the latex sets to a form-stable but flexible shape at a temperature preferably in the range of 38° to 93° C. within a time of 5 to 60 seconds. The latices are generally stabilized with ammonia which evaporates during heating. If a gas-impervious substratum is used with an ammonia-stabilized latex, it is desirable to use a low gelling temperature to avoid bubble formation by the ammonia. The temperature-time limits for setting will be different when other molding compositions such as polyvinyl chloride plastisols are used. The rate of rotation of the molding drum is adjusted to permit sufficient time for the molding composition to set. The substratum is contacted with the molding surface in an upper quadrant of the drum preferably an upper octant, and is removed over roll 9 in the other upper quadrant after having passed around and under the drum.

When latices are used, some water, usually 10 to 30 weight percent based on total latex composition, is exuded during gelling. The water tends to come out on the heated side of the mold and serves as a mold release agent facilitating stripping of the gelled shapes from the mold cavities as the substratum passes over roll 9. In this method of printing, there is 100 percent of transfer of the molding composition solids per pass from the mold cavity to the substratum.

The nature and/or degree of adhesion of the substratum to the rubber shapes can be controlled. Temporary adhesives can be used if the substratum is not to become part of the final product. The adhesion should be sufficient to assure good pickout of the rubber shapes from the molds. The flexibility of the molded rubber shape necessary to permit good stripping without damage thereto depends inter alia on the diameter of the mold drum and the mold cavity design. With proper care quite rigid shapes can be molded.

After being removed from the drum, the rubber shapes on the substratum can be dried and cured to develop their elastic properties. As shown in the drawing, this is done by passing the substratum through an infrared drying and heating unit 10 and heating the gelled rubber shapes to a temperature of 66° to 150° C. for a time of 15 to 360 minutes.

While the drawing illustrates the substratum and rubber rings thereon being rolled up on windup roll 11, the composite may thereafter be treated as desired. For example, an adhesive coating can be immediately placed on the rubber ring side and substratum can then be slit and packaged for delivery to the punching and cap inserting machine.

Punching and inserting of the seals into the bottle caps is done quite readily, using a Nagy paper inserting machine, slightly modified by installation of a clamping registration device. Sidelay alignment and the positioning of the punching operation can be controlled by printing a guideline and punching positioning units on an edge of the substratum, using printer roll 12, at the time the substratum is passing around the molding drum. A Markem printing wheel, printing a continuous line 13 for sidelay control, with spaced blocks for registration, has been found to be adequate. A photoelectric detecting system on the punching and inserting machine can then be used to control the insertion step.

In pilot plant experiments the molding drum consisted of a 52-inch (outside diameter) drum 12 inches wide engraved with a continuous pattern of mold cavities. The drum had a 1.25 inch thick aluminum shell and was heated to 66° C. by being three-quarters filled with recirculated hot water. The mold cavities were ring-shaped with the rings being semi-circular in cross-section. The rings had an outside diameter of one inch, an inside diameter of 0.658 inch and a thickness of 0.047 inch. Each mold cavity held about 3.09 grains of latex. Ten rows of mold cavities were used across the drum. Each row contained 120 cavities staggered on a 40° line to match the Nagy punch line. The laminate previously described was in contact with the molding surface for a circumferential distance of about 120 inches. The drum speed was 60 linear feet per minute, which gave a 10 second holding time for gelling of the latex. This produced the molded rings at a rate of 315,600 per hour. The laminate containing the gelled rubber rings was then heated to 120° C. for 0.75 hour to cure the rubber and develop its elastic properties. Curing conditions of 70° C. for six hours, and 82° C. for four hours were also used.

The latex used in these experiments was:

| | Parts by weight |
|---|---|
| Butadiene/styrene copolymer latex, 60% solids (Naugatuck Chemical 2107 latex) | 100 |
| Dispersed sulfur, 73% in water | 2.4 |
| Butyl dithio dicarbamate | 0.9 |
| Zinc oxide | 6.14 |
| Water | 4.3 |
| Sodium pentachlorophenate | 0.005 |
| Ammonium hydroxide | 3.1 |
| Benzoic acid | 1.7 |

The rubber in this system had a butadiene content of 55 weight percent, with the remainder being styrene. The viscosity of the latex compound was adjusted to 200 centipoises at 21° C. by the addition of additional water. After being cured at 88° C. for three hours, the rubber had the following properties:

Modulus at 600% elongation—500 p.s.i.
Modulus at 300% elongation—300 p.s.i.
Tensile=2000 p.s.i.
Recovery=50 to 55% (ASTM)

The viscosity of the molding composition is one of its most important characteristics. The viscosity is important because unduly high viscosities result in bubble entrapment in the mold cavities, at relatively high linear speeds above about 30 feet per minute. A water based molding composition desirably has a Brookfield viscosity in the range of 10 to 300, preferably 50 to 200, centipoises at 21° C. Lower viscosities in this range are needed with the more complicated mold shapes. When latices are used, high solids contents in the range of 50 to 75 weight percent are preferred because lower solids content result in high shrinkage, although latices having solids contents as low as 30 weight percent can be used. The necessary balancing of the ingredients of a latex to obtain a heat gellable composition is accomplished by methods known to the art, e.g., see Synthetic Rubber, Whitby, John Wiley & Sons, Inc., New York, N.Y., p. 957, and United States Patent Numbers 2,108,673 and 2,153,184.

For use in crown closures, the cured rubber should have relatively high modulus properties, i.e., a tensile greater than 250 p.s.i. at 300 percent elongation, and a recovery greater than 40 percent. The properties of the cured rubber for other applications can, of course, vary widely, depending on the use to which the rubber shape is to be put. It is preferred that the rubber be curable at a temperature in the range of 66° C. to 120° C. within ⅙ to 6 hours. Examples of rubbers that can be used are: natural; 45 to 60 percent styrene, 55 to 40 weight percent butadiene copolymers; and isobutylene copolymerized with a small percent, up to 3 percent of, isoprene or a similar monomer, cured using suitable curing systems known to the art. The amount of filler used in the rubber will usually be quite small, since excessive amounts unduly affect the viscosity of the latex. Zero to 10 weight percent of filler can be used in the latex.

In another embodiment of this invention, a thin sheet or film of plastic can be placed on the surface of the drum before the molding composition is nipped into the cavities, and can then be used to strip the elastomeric shapes from the drum after they have been set. For example, with reference to the drawing, a 0.002 to 0.010 inch thick film of polyethylene is placed on molding drum 4 in advance of the latex puddle 6. Roll 9 may be located further down on the drum in this instance. The film is heated on the surface of the drum and pushed into the molds, as by a Teflon roll having a matching design in cameo. The film thereafter passes under puddle 6 and roll 3. Substratum 1 again serves as the cope of the mold, but in this case it may be desired to have the elastomeric shapes adhere to the plastic film and to utilize the film as the carrier for the shapes. Crown closure seals can then be stamped from the film-ring composite as previously described. The seals formed in this manner have the thin plastic film serving to position the rubber ring in the crown closure and to protect the panel portion of the cup. This embodiment using a thin film between the drum and the molded shapes is particularly useful with plastisols.

A relatively low viscosity heat gelling latex was used in the above description as an example of a suitable molding composition. Higher viscosity compositions can be used if the molding drum is run at lower speeds. For example, a suitable plastisol composition that can be used is:

| | | |
|---|---|---|
| PVC[1] paste grade resin (Geon 121)[2] | parts | 80 |
| PVC general purpose resin (Geon 202)[2] | do | 20 |
| Wollastonite (calcium silicate) | phr[5] | 10.0 |
| Unslaked lime | phr[5] | 1.3 |
| Titanium dioxide | phr[5] | 3.0 |
| Dioctyl phthalate | phr[5] | 28.0 |
| Epoxidized soybean oil (Paraplex G-62)[3] | phr[5] | 25.0 |
| Wetting agent (Lipal 5C)[4] | phr[5] | 1.5 |
| Acetyl tributyl citrate | phr[5] | 25.0 |

[1] Polyvinyl chloride homopolymer.
[2] Supplied by Goodrich Chemical Company.
[3] Supplied by Rohm & Haas.
[4] Supplied by E. F. Drew and Company.
[5] Parts by weight on basis of total resin equalling 100.

The compound has a viscosity of about 1500–3000 centipoises (Brookfield Model RV5F, #3 spindle, 60 r.p.m., 38° C.) and fluxes at a temperature of 202° C. This plastisol is particularly suited for molding gaskets for 709 by 1011 pear-shaped ham can lids on 90 pound tin plate prior to stamping of the lids. Each mold cavity in this case contains about $4.3 \times 10^{-4}$ cubic inches per linear inch of compound. The mold may be coated with a mold release agent such as Teflon to facilitate stripping.

The substratum or cope of the mold, instead of being flat, can, also, be used to shape the rubber article. Thus, a thin, flexible metal sheet is embossed, or indented by stamping, with a design complementary to the design engraved on the molding cylinder. Registration can be assured by sprockets on the edges of the drum, and matching slots on the metal sheet.

Having described this invention, what is sought to be protected by Letters Patent is succinctly set forth in the following claims.

What is claimed is:

1. A method of forming a multiplicity of gasket shapes comprising filling a multiplicity of molded cavities of the desired shape in a printing surface with a liquid polymeric gasket-forming composition having a viscosity between about 10 and 300 centipoises at 21° C. and capable of setting to a form-stable solid at an elevated temperature, firmly and evenly placing a form-stable, paper-reinforced, gas impervious substratum against said printing surface, applying heat to the interior portion of said mold cavities to obtain setting of said composition to the form-stable shapes, removing the composite of said substratum with said shapes adhered thereto from said printing surface and thereafter punching the resulting composite into individual gasket units.

2. The method of claim 1 wherein said composition is a heat-gellable synthetic rubber latex and the gelled rubber shapes are heat dried and cured after removal from said printing surface.

3. A method according to claim 2 wherein the substratum is a trilaminate consisting of a waterproofed paper base, an intermediate thin film of vinylidene chloride polymer and an outer film of polyethylene and the paper side is coated with an adhesive and the latex is deposited onto the adhesive coating.

4. A method according to claim 3 wherein the rubber shapes are rings having a diameter in the range of 0.9 to 1 inch.

5. A method according to claim 1 wherein said printing surface is the outer surface of an internally heated rotating cylindrical roll with a horizontal axis, wherein said substratum is continuously placed against said surface over a nip roll in an upper quadrant of said cylindrical roll and wherein said molding composition is nipped into said mold cavities from a reservoir maintained in front of said nip roll.

6. A method for molding elastomeric gaskets which comprises providing a rotating cylindrical molding drum having a plurality of independent mold cavities cut in the surface thereof and a nip roll thereagainst in an upper quadrant thereof, passing a form-stable but flexible gas impervious, waterproofed paper substratum over said nip roll and firmly and evenly placing it against the surface of the molding drum maintaining in front of said nip roll a pool of a liquid water-based polymeric gasket-forming composition having a viscosity between about 10 and 300 centipoises at 21° C. and capable of conversion by heat to a form-stable elastomer, nipping molding composition into said mold cavities between said surface and said substratum, applying heat to the interior of said molding drum to convert the composition to form-stable elastomeric shapes, removing the composite of the substratum with said elastomeric shapes adhered thereto from the surface of said molding drum, and thereafter punching individual gaskets from the composite.

7. The method of claim 1 wherein the gasket-forming composition is a plastisol of a vinyl chloride polymer.

References Cited in the file of this patent

UNITED STATES PATENTS

| | | |
|---|---|---|
| 9,455 | Pond | Dec. 7, 1852 |
| 1,552,907 | Binmore | Sept. 8, 1925 |
| 1,665,355 | Gustafson | Apr. 10, 1928 |
| 1,751,430 | Thomson | Mar. 18, 1930 |
| 1,989,676 | Bodle | Feb. 5, 1935 |
| 2,593,439 | Gora | Apr. 22, 1952 |
| 2,813,299 | Massey | Nov. 19, 1957 |
| 2,815,573 | Trelease | Dec. 10, 1957 |
| 2,847,702 | Blaha | Aug. 19, 1958 |
| 2,865,046 | Bird | Dec. 23, 1958 |
| 2,920,977 | Adams | Jan. 12, 1960 |
| 2,949,639 | Woodward | Aug. 23, 1960 |
| 3,032,815 | Gerber | May 8, 1962 |
| 3,050,784 | Jerothe | Aug. 28, 1962 |

FOREIGN PATENTS

| | | |
|---|---|---|
| 793,118 | France | Jan. 16, 1936 |
| 1,117,251 | France | May 22, 1956 |
| 1,064,470 | Germany | Sept. 3, 1959 |